(12) United States Patent
Ookubo et al.

(10) Patent No.: US 12,104,043 B2
(45) Date of Patent: Oct. 1, 2024

(54) PROTECTIVE FILM AND SHEET

(71) Applicant: TOPPAN PRINTING CO., LTD., Tokyo (JP)

(72) Inventors: Toru Ookubo, Tokyo (JP); Daisuke Murata, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 546 days.

(21) Appl. No.: 17/122,804

(22) Filed: Dec. 15, 2020

(65) Prior Publication Data

US 2021/0095096 A1 Apr. 1, 2021

Related U.S. Application Data

(63) Continuation of application No. PCT/JP2019/024540, filed on Jun. 20, 2019.

(30) Foreign Application Priority Data

| Jun. 21, 2018 | (JP) | 2018-118254 |
| Jun. 21, 2018 | (JP) | 2018-118255 |
| Jun. 21, 2018 | (JP) | 2018-118256 |

(51) Int. Cl.
*C08K 5/3492* (2006.01)
*C08J 5/18* (2006.01)
(Continued)

(52) U.S. Cl.
CPC ............... *C08K 5/3492* (2013.01); *C08J 5/18* (2013.01); *C08J 7/0427* (2020.01); *C09D 5/32* (2013.01);
(Continued)

(58) Field of Classification Search
None
See application file for complete search history.

(56) References Cited

U.S. PATENT DOCUMENTS

| 5,668,200 A | 9/1997 | Valet et al. |
| 6,117,997 A | 9/2000 | Bulliard et al. |

(Continued)

FOREIGN PATENT DOCUMENTS

| CN | 107118481 A | 9/2017 |
| JP | H09-31067 A | 2/1997 |

(Continued)

OTHER PUBLICATIONS

Machine translation of JP H11-71356 A (Year: 1999).*

(Continued)

*Primary Examiner* — Ramsey Zacharia
(74) *Attorney, Agent, or Firm* — Foley & Lardner LLP

(57) ABSTRACT

A protective film that includes at least one of a transparent polyolefin resin layer and a surface protection layer, and that has excellent weather resistance and a low level of white turbidity, which is a factor that impairs design properties; and a sheet using the protective film. The protective film comprises at least a transparent polyolefin resin layer, wherein the transparent polyolefin resin layer contains a first hydroxyphenyltriazine-based ultraviolet absorber (UVA-A) having a structure represented by the general formula below. In the general formula, R1-R3 each independently represent a hydrogen atom, a methyl group, a phenyl group, or an alkoxy group, and at least two of R1-R3 are an alkoxy group having 8-18 carbon atoms, R4 and R5 each independently represent a hydroxyl group, a methyl group, or a hydrogen atom, and R6-R8 each independently represent a methyl group or a hydrogen atom.

10 Claims, 1 Drawing Sheet

(51) Int. Cl.
*C08J 7/04* (2020.01)
*C09D 5/32* (2006.01)
*C09D 175/04* (2006.01)

(52) U.S. Cl.
CPC ......... *C09D 175/04* (2013.01); *C08J 2323/00* (2013.01); *C08J 2475/04* (2013.01)

(56) References Cited

U.S. PATENT DOCUMENTS

| | | | |
|---|---|---|---|
| 6,184,375 | B1 | 2/2001 | Huglin et al. |
| 6,191,199 | B1 | 2/2001 | Renz et al. |
| 2002/0028861 | A1* | 3/2002 | Andrews .............. C08K 5/3492 524/106 |
| 2002/0083641 | A1* | 7/2002 | Leppard .............. C08K 5/3492 47/29.4 |
| 2004/0030009 | A1* | 2/2004 | Gugumus ............ C08K 5/3475 524/86 |
| 2004/0241111 | A1 | 12/2004 | Lazzari et al. |
| 2006/0235116 | A1 | 10/2006 | Lazzari et al. |
| 2011/0089384 | A1 | 4/2011 | Lazzari et al. |
| 2012/0145236 | A1 | 6/2012 | Fujiki |
| 2014/0141223 | A1* | 5/2014 | Yoda ....................... B32B 27/18 428/216 |
| 2018/0186131 | A1 | 7/2018 | Kudo et al. |
| 2018/0186132 | A1 | 7/2018 | Ikeda et al. |

FOREIGN PATENT DOCUMENTS

| | | | | |
|---|---|---|---|---|
| JP | H10-182621 | A | 7/1998 | |
| JP | H11-71356 | A | 3/1999 | |
| JP | 2000-326446 | A | 11/2000 | |
| JP | 2003-280234 | A | 10/2003 | |
| JP | 2007-217667 | A | 8/2007 | |
| JP | 2009-006513 | A | 1/2009 | |
| JP | 2011-518343 | A | 6/2011 | |
| JP | 2011-207186 | A | 10/2011 | |
| JP | 2013-502712 | A | 1/2013 | |
| JP | 2013-082211 | A | 5/2013 | |
| JP | 2013-184314 | A | 9/2013 | |
| JP | 2014-071355 | A | 4/2014 | |
| JP | 2016-168830 | A | 9/2016 | |
| JP | 2017-042916 | A | 3/2017 | |
| JP | 2017-152004 | A | 8/2017 | |
| JP | 2018-058222 | A | 4/2018 | |
| JP | 2019-044119 | A | 3/2019 | |
| JP | 2019-112505 | A | 7/2019 | |
| KR | 20060013418 | A | 2/2006 | |
| WO | WO-2009/112425 | A1 | 9/2009 | |
| WO | WO-2011/020762 | A1 | 2/2011 | |
| WO | WO-2016/046300 | A1 | 3/2016 | |
| WO | WO-2016181827 | A1 * | 11/2016 | ............. B32B 27/18 |
| WO | WO-2017/039003 | A1 | 3/2017 | |

OTHER PUBLICATIONS

Machine translation of JPWO 2016181827 A1 (Year: 2016).*
Office Action, dated May 17, 2022, issued in corresponding Japanese Patent Application No. JP2018-118255.
International Searching Authority, "International Search Report," issued in connection with International Patent Application No. PCT/JP2019/024540, dated Sep. 24, 2019.
European Extended Search Report, dated Aug. 18, 2021, issued in corresponding European Patent Application No. 19821944.6, (8 pages).
Office Action issued in corresponding Japanese Patent Application No. 2018-118254, dated Nov. 22, 2022.
Office Action issued in corresponding Japanese Patent Application No. 2018-118254, dated Apr. 25, 2023.
Translation of International Searching Authority, "Written Opinion," issued in connection with International Patent Application No. PCT/JP2019/024540, dated Sep. 24, 2019 (10 pages).
Office Action issued in corresponding Chinese Patent Application No. 201980041048.8 dated Aug. 16, 2023 (10 pages).
Office Action issued in corresponding Korean Patent Application No. 10-2021-7001525 dated Apr. 15, 2024 (11 pages).

* cited by examiner

PROTECTIVE FILM AND SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/024540, filed on Jun. 20, 2019, which is based upon and claims the benefit of priority to Japanese Patent Application Nos. 2018-118254, 2018-118255, and 2018-118256, all filed on Jun. 21, 2018; the disclosures of which are incorporated herein by reference in their entireties.

TECHNICAL FIELD

The present invention relates to a protective film and a sheet using the protective film.

BACKGROUND

Conventionally, general printed matter does not have a high resistance to ultraviolet light or water. Therefore, in applications such as decorative sheets and posters used outdoors which require resistance to these (weather resistance), a transparent protective film is provided on the surface layer for the purpose of protecting the printed matter.

As the material of the transparent protective film, in addition to fluororesins and acrylic resins, which have excellent weather resistance, polyolefins and the like having a cost advantage are preferably used; however, additives such as ultraviolet absorbers are generally used because polyolefins often have insufficient weather resistance. For example, hydroxyphenyltriazine compounds have been proposed as ultraviolet absorbers that impart excellent weather resistance (PTL 1 and 2). However, application of a hydroxyphenyltriazine-based ultraviolet absorber to a polyolefin not only causes variations in the weather resistance of the transparent film depending on the structure of the ultraviolet absorber, but also the resulting white turbidity impairs the design properties of the printed matter in some cases. Furthermore, the ultraviolet absorber is required to not only have a function of protecting the printed matter, but also a function of suppressing deterioration of the protective film itself; however, it is difficult to achieve both of these functions while avoiding white turbidity in the protective film.

Moreover, some protective films have a surface protection layer, and the surface protection layer can sometimes be a transparent hard coat layer which is provided to impart scratch resistance and abrasion resistance to the protective film. In addition, an additive such as an ultraviolet absorber for imparting weather resistance is sometimes added to the surface protection layer. For example, hydroxyphenyltriazine compounds have been proposed as ultraviolet absorbers that impart excellent weather resistance (PTL 1 and 2). However, application of a hydroxyphenyltriazine-based ultraviolet absorber to a surface protection layer not only causes variations in the weather resistance depending on the structure of the ultraviolet absorber, but also the resulting white turbidity impairs the design properties of the printed matter in some cases.

CITATION LIST

Patent Literature

PTL 1: US 2004/0241111 A1; PTL 2: U.S. Pat. No. 6,191,199 B

SUMMARY OF THE INVENTION

Technical Problem

The present invention addresses the above problems, and has an object of providing: a protective film that includes at least one of a transparent polyolefin resin layer and a surface protection layer, and that has excellent weather resistance and a low level of white turbidity, which is a factor that impairs design properties; and a sheet using the protective film.

Solution to Problem

As a result of intensive investigation, the present inventors have found that the above aim is achieved by a protective film whose transparent polyolefin resin layer and/or surface protection layer contains an ultraviolet absorber composed of a hydroxyphenyltriazine compound having a specific structure, and a sheet using the protective film, and have arrived at the present invention.

An aspect of the present invention for solving the above problem is a protective film comprising at least a transparent polyolefin resin layer, wherein the transparent polyolefin resin layer contains a hydroxyphenyltriazine-based ultraviolet absorber having a structure represented by general formula (1) below.

[Chemical Formula 1]

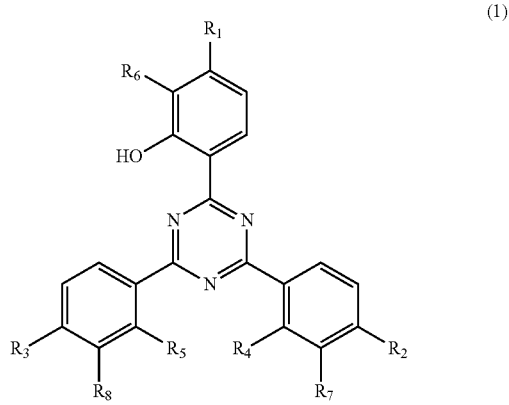

In general formula (1), R1-R3 each independently represent a hydrogen atom, a methyl group, a phenyl group, or an alkoxy group, and at least two of R1-R3 are an alkoxy group having 8-18 carbon atoms, R4 and R5 each independently represent a hydroxyl group, a methyl group, or a hydrogen atom, and R6-R8 each independently represent a methyl group or a hydrogen atom.

Furthermore, another aspect of the present invention for solving the above problem is a protective film comprising at least a surface protection layer and a transparent resin layer formed below the surface protection layer, wherein the surface protection layer contains a hydroxyphenyltriazine-based ultraviolet absorber having a structure represented by general formula (2) below.

[Chemical Formula 2]

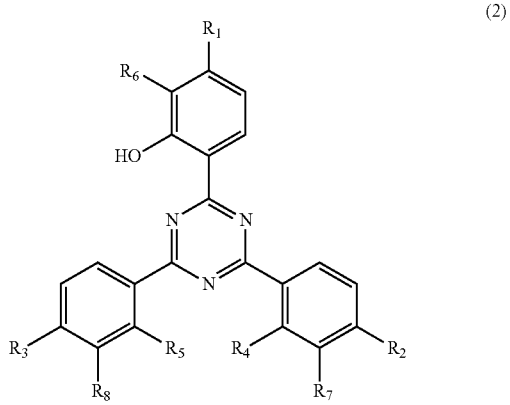

(2)

In general formula (2), R1-R3 each independently represent a hydrogen atom, a methyl group, a phenyl group, or an alkoxy group, and at least two of R1-R3 are an alkoxy group having 8-18 carbon atoms and not containing a carbonyl group, R4 and R5 each independently represent a hydroxyl group, a methyl group, or a hydrogen atom, and R6-R8 each independently represent a methyl group or a hydrogen atom)

Advantageous Effects of the Invention

An aspect of the present invention provides a protective film that includes at least one of a transparent polyolefin resin layer and a surface protection layer, and that has excellent weather resistance and a low level of white turbidity, which is a factor that impairs design properties; and a sheet using the protective film.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

Figure 1:
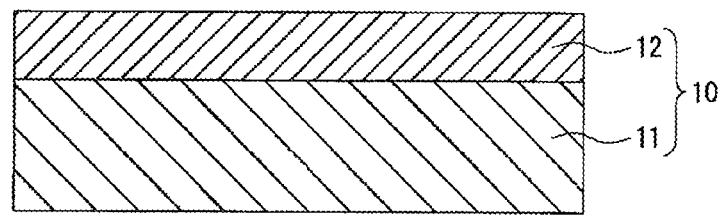
FIG. 1 is a schematic view showing a cross-section of a protective film according to a first embodiment of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments First Embodiment As a first embodiment of the present invention, the configuration of a protective film 10, in which a surface protection layer 12 is provided on a transparent polyolefin resin layer 11, will be described with reference to FIG. 1. It is noted that identical or corresponding components are given the same reference numerals throughout the drawings described below, and redundant description will be omitted as appropriate. The present embodiment is only an example of a configuration for embodying the technical idea of the present invention, and accordingly, materials, shapes, structures, arrangements, dimensions and the like of the individual parts should not be limited to those described below. The technical idea of the present invention can be modified in various ways within the technical scope defined by the claims.

(Transparent Polyolefin Resin Layer)

The protective film 10 according to the present embodiment comprises a transparent polyolefin resin layer 11, and a surface protection layer 12 formed on one side of the transparent polyolefin resin layer 11, that is, above the transparent polyolefin resin layer 11.

Examples of the olefin resin constituting the transparent polyolefin resin layer 11 according to the present embodiment include, besides polypropylene, polyethylene, polybutene, and the like, a homopolymer or a copolymer of one or more α-olefins (e.g., propylene, 1-butene, 1-pentene, 1-hexene, 1-heptene, 1-octene, 1-nonene, 1-decene, 1-undecene, 1-dodecene, tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1 -hexene, 3-ethyl-1 -hexene, 9-methyl-1-decene, 11-methyl-1-dodecene, 12-ethyl-1-tetradecene, etc.), and a copolymer of ethylene or an α-olefin with another monomer, for example, an ethylene-vinyl acetate copolymer, ethylene-vinyl alcohol copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, and the like. Further, in order to improve the surface hardness of the protective film 10, highly crystalline polypropylene is preferably used.

The transparent polyolefin resin layer 11 preferably contains a first hydroxyphenyltriazine-based ultraviolet absorber (UVA-A) having a structure represented by general formula (1) below, more preferably contains an ultraviolet absorber having a structure represented by general formula (3) below, and still more preferably contains 2,4-bis[2-hydroxy-4-(2-ethylhexyloxy)phenyl)]-6-(4-methoxyphenyl)-s-triazine shown in formula (4) below.

[Chemical Formula 3]

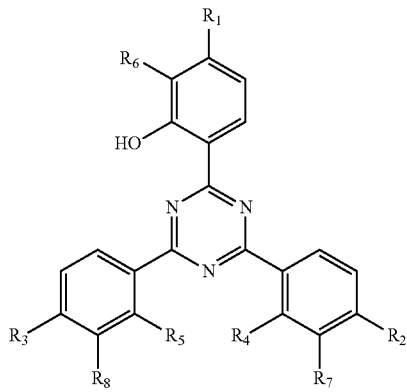

(1)

In general formula (1), R1-R3 each independently represent a hydrogen atom, a methyl group, a phenyl group, or an alkoxy group, and at least two of R1-R3 are an alkoxy group having 8-18 carbon atoms, R4 and R5 each independently represent a hydroxyl group, a methyl group, or a hydrogen atom, and R6-R8 each independently represent a methyl group or a hydrogen atom.

[Chemical Formula 4]

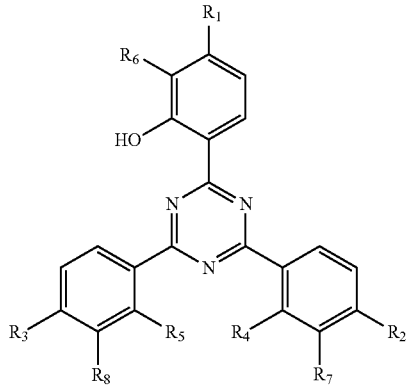

(3)

In general formula (3), R1 and R2 represent an alkoxy group having 8-18 carbon atoms, R3 represents an alkoxy group having 1-4 carbon atoms, R4 represents a hydroxyl group, and R5-R8 represent a hydrogen atom.

[Chemical Formula 5]

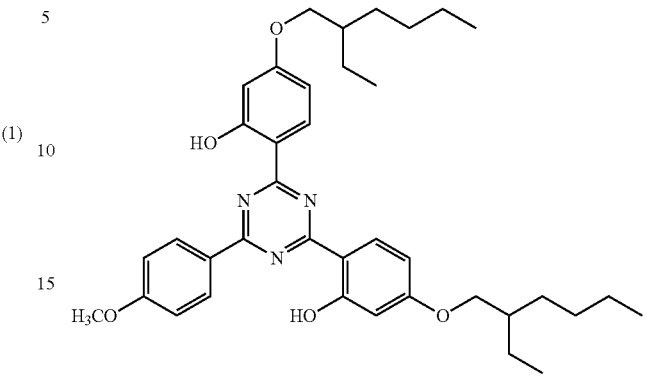

(4)

The content of the first hydroxyphenyltriazine-based ultraviolet absorber (UVA-A) is not particularly limited, and is appropriately set according to the thickness of the transparent polyolefin resin layer 11 and various conditions relating to the adhesive layer 20 and the substrate 30 described below; however, the content of the first hydroxyphenyltriazine-based ultraviolet absorber (UVA-A) is typically within a range of 0.1 parts by mass or more and 2 parts by mass or less with respect to 100 parts by mass of the olefin resin. If the content of the first hydroxyphenyltriazine-based ultraviolet absorber (UVA-A) is less than 0.1 parts by mass, it may not be possible to impart a sufficient weather resistance to the transparent polyolefin resin layer. Furthermore, if the content of the first hydroxyphenyltriazine-based ultraviolet absorber (UVA-A) exceeds 2 parts by mass, white turbidity becomes very noticeable in the transparent polyolefin resin layer, and problems can sometimes occur in the design properties of the sheet, such as the decorative sheet 40 described below, in which a protective film 10 and a substrate 30 are bonded together.

The transparent polyolefin resin layer 11 may contain various additives such as an ultraviolet absorber that does not correspond to the first hydroxyphenyltriazine-based ultraviolet absorber (UVA-A) mentioned above, a thermal stabilizer, a light stabilizer, an antiblocking agent, a catalyst scavenger, a colorant, a light scattering agent, and a gloss adjuster as necessary.

Examples of such an ultraviolet absorber include hydroxyphenyltriazine compounds such as 2,4,6-tris(2-hydroxy-4-hexyloxy-3-methylphenyl)-s-triazine, 2-[2-hydroxy-4-(2-ethylhexyloxy)phenyl]-4,6-dibiphenyl-s-triazine, and 2-[[2-hydroxy-4-[1-(2-ethylhexyloxycarbonyl)ethyloxy]phenyl]]-4,6-diphenyl-s-triazine, and benzotriazole-based ultraviolet absorbers such as 2-(5-chloro-2H-benzotriazol-2-yl)-6-tert-butyl-4-methylphenol, and 2-(5-chloro-2-benzotriazolyl)-6-tert-butyl-p-cresol.

Examples of the light stabilizer include hindered amine light stabilizers such as 2-(3,5-di-tert-butyl-4-hydroxybenzyl)-2'-n-butylmalonate bis(1,2,2,6,6-pentamethyl-4-piperidyl), bis(1,2,2,6,6-pentamethyl-4-piperidyl) sebacate, and tetrakis(2,2,6,6-tetramethyl-4-piperidyl)-1,2,3,4-butanetetracarboxylate.

The method of producing the transparent polyolefin resin layer 11 is not particularly limited, and common methods such as calender film formation and extrusion film formation can be used to form a transparent polyolefin resin layer containing the olefin resin, the hydroxyphenyltriazine-based ultraviolet absorber, and various additives as described above.

The surface of the transparent polyolefin resin layer 11 may be provided with asperities to impart design properties. The method of providing asperities includes a method in which the transparent polyolefin resin film is formed by extrusion molding and then subjected to hot embossing, and a method in which embossing is carried out at the same time as extrusion molding, using a cooling roll provided with asperities, during extrusion molding.

(Additional Embodiment of Transparent Polyolefin Resin Layer)

The transparent polyolefin resin layer according to the present invention is not limited to the transparent polyolefin resin layer 11 according to the embodiment described above. The transparent polyolefin resin layer 11 according to the present embodiment may contain, for example, a second hydroxyphenyltriazine-based ultraviolet absorber (UVA-B) in addition to the first hydroxyphenyltriazine-based ultraviolet absorber (UVA-A). Hereinafter, this form will be described.

The transparent polyolefin resin layer 11 contains hydroxyphenyltriazine-based ultraviolet absorbers having structures represented by general formulas (1) and (5) below, that is, the first hydroxyphenyltriazine-based ultraviolet absorber UVA-A and the second hydroxyphenyltriazine-based ultraviolet absorber UVA-B, such that the mass ratio between UVA-A and UVA-B (UVA-A/UVA-B) is in a range of 20/80 to 80/20.

In terms of protecting printed matter using the protective film 10 according to the present embodiment, if the mass ratio between UVA-A and UVA-B (UVA-A/UVA-B) is less than 20/80, the content of UVA-A is excessively small, which can cause discoloration of the pattern layer 32 described below to become significant. Furthermore, if the mass ratio between UVA-A and UVA-B (UVA-A/UVA-B) exceeds 80/20, the content of UVA-A is excessively high, which can cause the absorption on the short wavelength side to become weak, and can result in whitening or cracking of the protective film 10. Therefore, in either case, a problem can occur in terms of weather resistance.

UVA-A is preferably a compound represented by general formula (3) below, and more preferably is the compound shown in formula (4) below, namely 2,4-bis[2-hydroxy-4-(2-ethylhexyloxy)phenyl]-6-(4-methoxyphenyl)-s-triazine.

UVA-B is preferably a compound represented by formulas (6), (7), and (8) below, and more preferably is the compound shown in formula (6) below, namely 2,4-bis(2,4-dimethylphenyl)-6-[2-hydroxy-4-(octyloxy)phenyl]-s-triazine. The octyloxy group of these compounds may include both straight chains and branched chains.

[Chemical Formula 6]

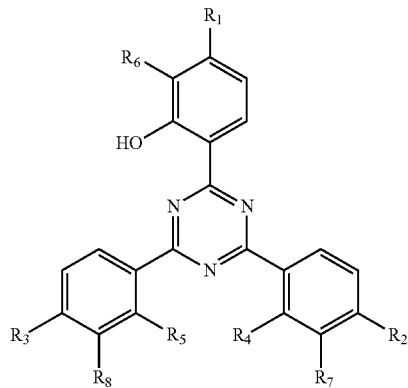

(1)

In general formula (1), $R_1$-$R_3$ each independently represent a hydrogen atom, a methyl group, a phenyl group, or an alkoxy group, and at least two of $R_1$-$R_3$ are an alkoxy group having 8-18 carbon atoms, $R_4$ and $R_5$ each independently represent a hydroxyl group, a methyl group, or a hydrogen atom, and $R_6$-$R_8$ each independently represent a methyl group or a hydrogen atom.

[Chemical Formula 7]

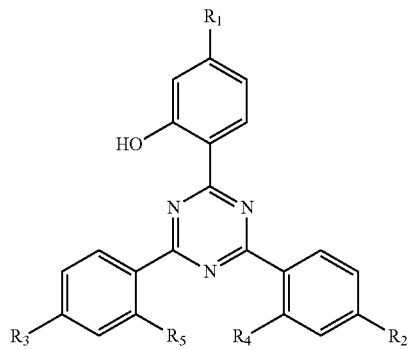

(5)

In general formula (5), $R_1$ is an alkoxy group having 8-18 carbon atoms, and $R_2$-$R_5$ each independently represent a hydrogen atom or a methyl group.

[Chemical Formula 8]

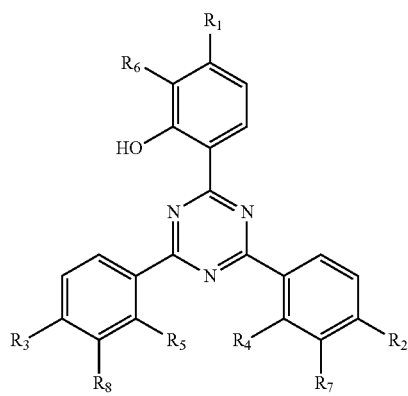

(3)

In general formula (3), R1 and R2 represent an alkoxy group having 8-18 carbon atoms, R3 represents an alkoxy group having 1-4 carbon atoms, R4 represents a hydroxyl group, and R5-R8 represent a hydrogen atom.

[Chemical Formula 9]

(4)

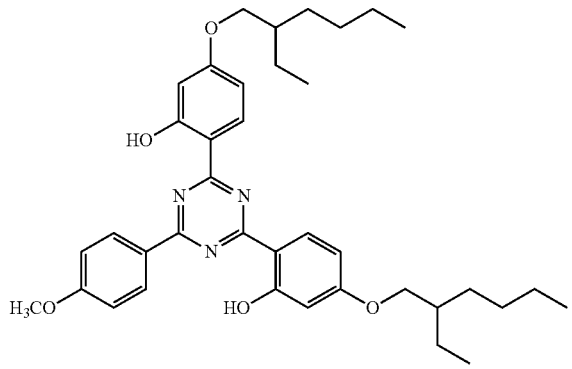

[Chemical Formula 10]

(6)

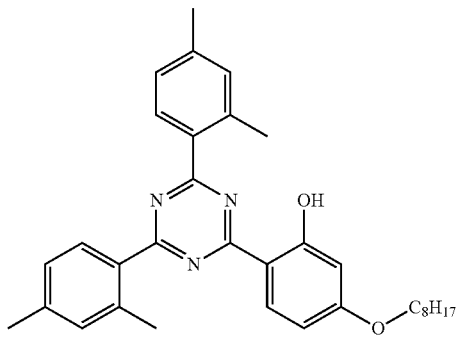

[Chemical Formula 11]

(7)

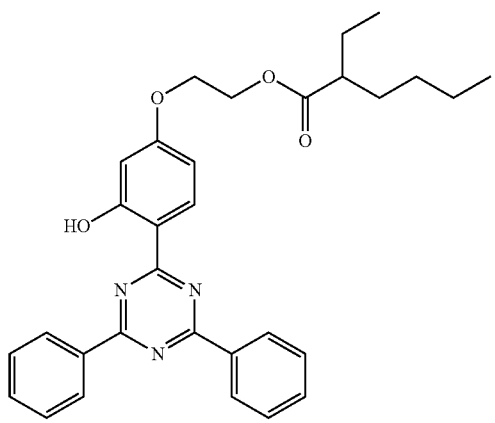

[Chemical Formula 12]

(8)

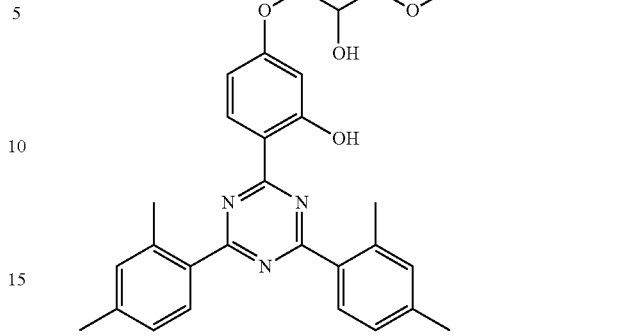

The content of the hydroxyphenyltriazine-based ultraviolet absorber, that is, UVA-A and UVA-B, is not particularly limited, and is appropriately set according to the thickness of the transparent polyolefin resin layer 11 and various conditions relating to the adhesive layer 20 and the substrate 30 described below; however, the content of the hydroxyphenyltriazine-based ultraviolet absorber is typically within a range of 0.1 parts by mass or more and 2 parts by mass or less with respect to 100 parts by mass of the olefin resin. If the content of the hydroxyphenyltriazine-based ultraviolet absorber is less than 0.1 parts by mass with respect to 100 parts by mass of the olefin resin, it may not be possible to impart a sufficient weather resistance to the transparent polyolefin resin layer. Furthermore, if the content of the hydroxyphenyltriazine-based ultraviolet absorber exceeds 2 parts by mass, white turbidity becomes very noticeable in the transparent polyolefin resin layer, and problems can sometimes occur in the design properties of the sheet, such as the decorative sheet 40 described below, in which a protective film 10 and a substrate 30 are bonded together.

The transparent polyolefin resin layer 11 may have an average absorbance of 0.5 or more in a wavelength range of 250 nm or more and 400 nm or less, and a value obtained by dividing its absorbance at 370 nm by its absorbance at 280 nm within a range of 0.20 or more and 0.9 or less.

If the average absorbance in the wavelength range of 250 nm or more and 400 nm or less is less than 0.5, discoloration of the pattern layer 32 described below may occur, or the weather resistance of the transparent polyolefin resin layer 11 may decrease. Furthermore, if the value obtained by dividing the absorbance at 370 nm by the absorbance at 280 nm is less than 0.20, discoloration of the pattern layer 32 may occur. Moreover, if the value obtained by dividing the absorbance at 370 nm by the absorbance at 280 nm exceeds 0.9, the weather resistance of the transparent polyolefin resin layer 11 may decrease.

The transparent polyolefin resin layer 11 preferably contains a hindered amine light stabilizer to improve the weather resistance, and examples of the hindered amine light stabilizer that can be used include known materials such as 2-(3,5-di-tert-butyl-4-hydroxybenzyl)-2'-n-butylmalonate bis(1,2,2,6,6-pentamethyl-4-piperidyl), bis(1,2,2,6,6-pentamethyl-4-piperidyl) sebacate, and tetrakis(2,2, 6,6-tetramethyl-4-piperidyl)-1,2,3,4-butanetetracarboxylate.

The content of the hindered amine light stabilizer is preferably in a range of 0.1 parts by mass or more and 5 parts by mass or less with respect to 100 parts by mass of the transparent polyolefin resin, and more preferably in a range of 0.3 parts by mass or more and 3 parts by mass or less. If the content of the hindered amine light stabilizer is less than 0.1 parts by mass, the effect of improving the weather resistance is not sufficiently exhibited, and if the content exceeds 5 parts by mass, there is a greater possibility that the hindered amine light stabilizer will bleed out and cause a reduction in design properties or poor adhesion with the adjacent layer.

As described above, if the protective film comprises a transparent polyolefin resin layer containing an ultraviolet absorber composed of a hydroxyphenyltriazine compound having a specific structure in a prescribed mixing ratio, it is possible to provide a protective film that includes a transparent polyolefin resin layer having a low level of white turbidity, which is a factor that impairs design properties, and that achieves both a function of protecting printed matter and a function of suppressing deterioration of the protective film itself, and a sheet using the protective film.

(Surface Protection Layer)

The surface protection layer 12 according to the present embodiment is a layer which is provided to impart functions such as weather resistance, scratch resistance, stain resistance, and design properties to the protective film 10. The material forming the surface protection layer 12 is not particularly limited, and can be appropriately selected from resin materials such as urethane-based, acrylic-based, acrylic silicone-based, fluorine-based, and epoxy-based resin materials.

The surface protection layer 12 may contain various additives such as an ultraviolet absorber, a thermal stabilizer, a light stabilizer, an anti-blocking agent, a catalyst scavenger, a colorant, a light scattering agent, and a gloss adjuster as necessary. Examples of the ultraviolet absorber and the light stabilizer include those applied to the transparent polyolefin resin layer 11 described above.

The method of forming the surface protection layer 12 is not particularly limited, and the surface protection layer 12 may be formed by applying a liquid coating of the above materials by a common method such as gravure coating, microgravure coating, comma coating, knife coating, or die coating, and then curing the liquid coating by a method suitable for the material, such as heat curing or ultraviolet curing.

Furthermore, the surface protection layer 12 may be provided after bonding the transparent polyolefin resin layer 11 to the substrate 30 described below.

(Additional Embodiment of Surface Protection Layer)

The surface protection layer according to the present invention is not limited to the surface protection layer 12 according to the embodiment described above. The surface protection layer 12 according to the present embodiment may, for example, include a hydroxyphenyltriazine-based ultraviolet absorber. Note that, in an embodiment in which the surface protection layer 12 contains a hydroxyphenyltriazine-based ultraviolet absorber, the resin layer formed below the surface protection layer 12 is not limited to a transparent polyolefin resin layer formed of a polyolefin resin, and can be any transparent resin layer.

Hereinafter, an embodiment in which a hydroxyphenyltriazine-based ultraviolet absorber is added to the surface protection layer 12 will be described.

The protective film 10 according to the present embodiment may include a transparent resin layer 11, and a surface protection layer 12 formed on one side of the transparent resin layer 11, that is, above the transparent resin layer 11.

The surface protection layer 12 according to the present embodiment is a layer provided to impart, for example, weather resistance, scratch resistance, stain resistance, and design properties to the protective film 10, and can be formed, for example, by applying a liquid coating of various curable resin materials to the transparent resin layer 11, and then curing the coating.

Examples of the curable resin material include heat-curable resins which contain hydroxyl groups or epoxy groups as curing sites, and ionizing radiation-curable resins containing unsaturated double bonds; heat-curable resins are preferable from the viewpoint of the weather resistance. Ionizing radiation curing primarily uses ultraviolet rays or an electron beam. Ionizing radiation curing can have a disadvantage from the viewpoint of weather resistance in that the ultraviolet absorber which is typically included in the surface protection layer 12 inhibits curing, which limits the type of the ultraviolet absorbers that can be used. Furthermore, electron beam curing may adversely affect the weather resistance because the electron beam penetrates deeply, and can damage the transparent resin layer below the surface protection layer 12.

A two-component curing polyurethane resin is particularly preferable as the heat-curable resin according to the present embodiment from the viewpoint of the curing temperature. That is, the surface protection layer 12 according to the present embodiment is preferably formed of a two-component curing polyurethane resin. The two-component curing polyurethane resin is, for example, a resin which is cured by forming urethane bonds between a polyol and a polyisocyanate. The polyol may be, for example, an acrylic polyol, a polyester polyol, a polycarbonate polyol, or the like. The polyisocyanate may be, for example, hexamethylene diisocyanate, isophorone diisocyanate, xylylene diisocyanate, hydrogenated xylene diisocyanate, diphenylmethane diisocyanate, hydrogenated diphenylmethane diisocyanate, or the like.

The surface protection layer 12 preferably contains a hydroxyphenyltriazine-based ultraviolet absorber having a structure represented by general formula (2) below, more preferably contains an ultraviolet absorber having a structure represented by general formula (3) below, and still more preferably contains 2,4-bis[2-hydroxy-4-(2-ethylhexyloxy)phenyl]-6-(4-methoxyphenyl)-s-triazine shown in formula (4) below.

[Chemical Formula 13]

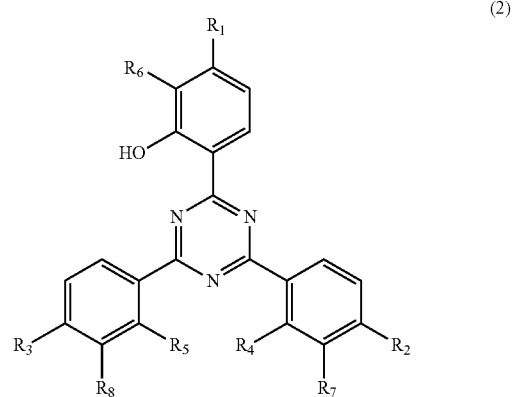

In general formula (2), R1-R3 each independently represent a hydrogen atom, a methyl group, a phenyl group, or an alkoxy group, and at least two of R1-R3 are an alkoxy group having 8-18 carbon atoms and not containing a carbonyl group, R4 and R5 each independently represent a hydroxyl group, a methyl group, or a hydrogen atom, and R6-R8 each independently represent a methyl group or a hydrogen atom.

[Chemical Formula 14]

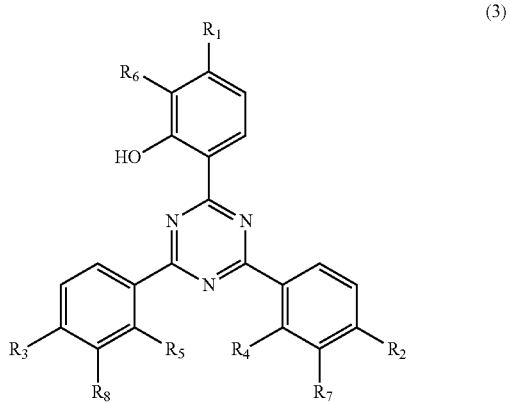

(3)

In general formula (3), R1 and R2 represent an alkoxy group having 8-18 carbon atoms, R3 represents an alkoxy group having 1-4 carbon atoms, R4 represents a hydroxyl group, and R5-R8 represent a hydrogen atom.

[Chemical Formula 15]

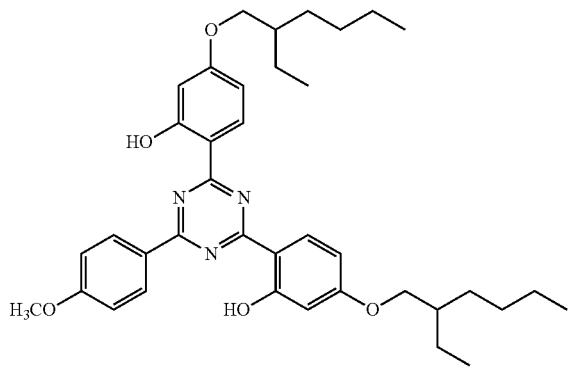

(4)

The content of the hydroxyphenyltriazine-based ultraviolet absorber is not particularly limited, and is appropriately set according to the thickness of the surface protection layer 12 and various conditions relating to the adhesive layer 20 and the substrate 30 described below; the content of the hydroxyphenyltriazine-based ultraviolet absorber is typically within a range of 1 part by mass or more and 20 parts by mass or less with respect to 100 parts by mass of the resin constituting the surface protection layer 12. If the content of the hydroxyphenyltriazine-based ultraviolet absorber is less than 1 part by mass, it may not be possible to impart sufficient weather resistance to the protective film 10. If the content of the hydroxyphenyltriazine-based ultraviolet absorber exceeds 20 parts by mass, there is a greater possibility that problems such as a reduction in the strength of the surface protection layer 12 and bleeding of the ultraviolet absorber will occur.

The surface protection layer 12 may contain various additives such as an ultraviolet absorber that does not correspond to the hydroxyphenyltriazine-based ultraviolet absorber mentioned above, a thermal stabilizer, a light stabilizer, an antiblocking agent, a catalyst scavenger, a colorant, a light scattering agent, and a gloss adjuster as necessary.

Examples of such an ultraviolet absorber include hydroxyphenyltriazine compounds such as 2,4-bis(2,4-dimethylphenyl)-6-(2-hydroxy-4-n-octyloxyphenyl)-s-triazine, 2,4,6-tris(2-hydroxy-4-hexyloxy-3-methylphenyl)-s-triazine, 2-[2-hydroxy-4-(2-ethylhexyloxy)phenyl]-4,6-diphenyl-s-triazine, and 2-[[2-hydroxy-4-[1-(2-ethylhexyloxycarbonyl)ethyloxy]phenyl]]-4,6-diphenyl-s-triazine, and benzotriazole-based ultraviolet absorbers such as 2-(5-chloro-2H-benzotriazol-2-yl)-6-tert-butyl-4-methylphenol, and 2-(5-chloro-2-benzotriazolyl)-6-tert-butyl-p-cresol.

Examples of the light stabilizer include hindered amine light stabilizers such as 2-(3,5-di-tert-butyl-4-hydroxybenzyl)-2'-n-butylmalonate bis(1,2,2,6,6-pentamethyl-4-piperidyl), bis(1,2,2,6,6-pentamethyl-4-piperidyl) sebacate, and tetrakis(2,2,6,6-tetramethyl-4-piperidyl)-1,2,3,4-butanetetracarboxylate.

As described above, if the protective film comprising a surface protection layer and a transparent resin layer is a protective film whose surface protection layer contains an ultraviolet absorber composed of a hydroxyphenyltriazine compound having a specific structure, it is possible to provide a protective film that includes a surface protection layer having superior weather resistance and a low level of white turbidity, which is a factor that impairs design properties, and a sheet using the protective film.

Second Embodiment

Figure 2:
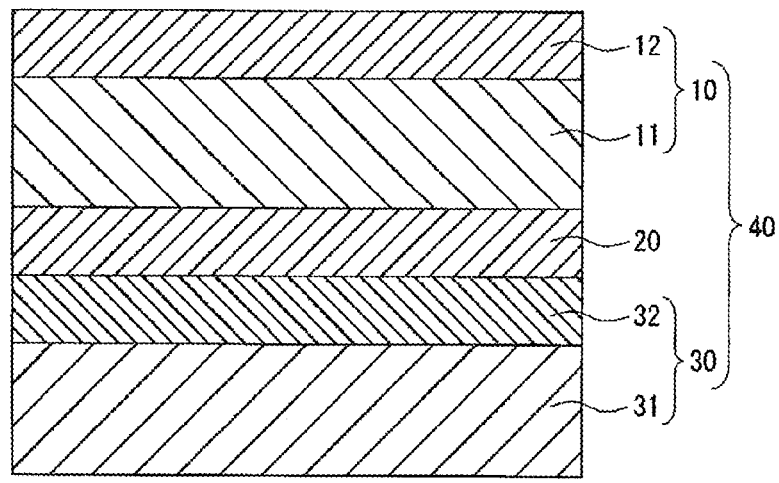
FIG. 2 is a schematic view showing a cross-section of a decorative sheet according to a second embodiment of the present invention.

As a second embodiment of the present invention, a configuration in which the protective film 10 according to the first embodiment and a substrate 30 are bonded together to form a decorative sheet 40 will be described with reference to FIG. 2.

The decorative sheet 40 is configured by bonding the protective film 10, which comprises a surface protection layer 12 and a transparent polyolefin resin layer 11, that is, the protective film 10 according to the first embodiment, to a substrate 30 via an adhesive layer 20. Note that FIG. 2 shows a decorative sheet 40 in which the transparent polyolefin resin layer 11 provided in the protective film 10 and a pattern layer 32 provided in the substrate 30 described below are bonded together via an adhesive layer 20.

(Primary Film)

The substrate 30 comprises a primary film 31, and a pattern layer 32 provided on one side of the primary film 31.

the primary film 31 may be selected from, for example, paper such as tissue paper, titanium paper, and resin-impregnated paper, synthetic resins such as polyethylene, polypropylene, polybutylene, polystyrene, polycarbonate, polyester, polyamide, ethylene-vinyl acetate copolymer, polyvinyl alcohol, and acrylic resin, foams of these synthetic resins, rubber such as ethylene-propylene copolymer rubber, ethylene-propylene-diene copolymer rubber, styrene-butadiene copolymer rubber, styrene-isoprene-styrene block copolymer rubber, styrene-butadiene-styrene block copolymer rubber, and polyurethane, an organic or inorganic nonwoven fabric, synthetic paper, and metal foils such as of aluminum, iron, gold, and silver.

In order to supplement the adhesion of the primary film 31 with an adjacent layer, for example, one or both surfaces of the primary film 31 may be provided with a primer layer (not shown), and a surface treatment such as corona treatment, plasma treatment, ozone treatment, electron beam treatment, ultraviolet treatment, dichromic acid treatment may also be performed.

(Pattern Layer)

The pattern layer 32 is, for example, a pattern printed on the primary film 31 using an ink. The ink used to form the pattern layer 32 may contain a binder, and the binder can be appropriately selected from, for example, nitrocellulose, cellulose, vinyl chloride-vinyl acetate copolymer, polyvinyl butyral, polyurethane, acrylic, and polyester binders, and modified products thereof. Furthermore, these may be any of aqueous, solvent, and emulsion types, and may be a one-part type or a two-component type which uses a curing agent.

Examples of the method of curing the ink used to form the pattern layer 32 include methods that cure an ink by irradiation of ultraviolet light, an electron beam, or the like. Among these, the most typical method is the use of a urethane-based ink cured by isocyanate.

The ink used to form the pattern layer 32 includes, in addition to these binders, various additives included in a typical ink, and examples include coloring agents such as pigments or dyes, extender pigments, solvents, and light stabilizers. Examples of highly versatile pigments include condensed azo pigments, insoluble azo pigments, quinacridone, isoindoline, anthraquinone, imidazolone, cobalt, phthalocyanine, carbon, titanium oxide, iron oxide, pearl pigments of mica, and the like.

The method of providing the pattern layer 32 is not particularly limited, and common printing methods such as gravure printing, offset printing, screen printing, flexo printing, and inkjet printing can be used.

The method of bonding the protective film 10 to the substrate 30 is not particularly limited, and it is possible to use various lamination methods such as heat lamination, extrusion lamination, dry lamination, and sandwich lamination via the adhesive layer 20 as necessary.

The adhesive layer 20 is not particularly limited, and is formed using appropriately selected resin material, such as a urethane-based, acrylic-based, acrylic silicone-based, fluorine-based, or epoxy-based resin material to form an ink material, and then performing a common coating method such as gravure coating, microgravure coating, comma coating, knife coating, or die coating.

In terms of the thickness of each layer constituting the decorative sheet 40 according to the present embodiment, it is preferable for the primary film 31 to have a thickness of 20 µm to 150 µm in consideration of, for example, the printing workability and cost, the adhesive layer 20 to have a thickness of 0.2 µm to 20 µm, the transparent polyolefin resin layer 11 to have a thickness of 20 µm to 200 µm, and the surface protection layer 12 to have a thickness of 3 µm to 20 µm. Furthermore, the total thickness of the decorative sheet 40 is preferably in the range of 45 µm to 250 µm.

EXAMPLES

Hereinafter, the present invention will be described in detail by way of Examples and Comparative Examples.

First Example

Example 1-1a

To 100 parts by mass of a transparent homopolypropylene resin (Prime Polypro; manufactured by Prime Polymer Co., Ltd) were added 0.5 parts by mass of a light stabilizer (Tinuvin XT55; manufactured by BASF Japan Ltd.) and 0.5 parts by mass of the compound represented by formula (4) below as a hydroxyphenyltriazine-based ultraviolet absorber (TINOSORB S; manufactured by BASF Japan Ltd.), and the protective film of Example 1-1a was obtained by melt extrusion of the resulting resin composition at a thickness of 80 µm.

Example 1-1b

A substrate was obtained by forming a pattern layer (thickness 3 µm) by gravure printing a wood grain pattern using a two-component urethane ink (V180; manufactured by Toyo Ink Co., Ltd.) on an opaque polyethylene primary film (thickness 70 µm), and the substrate was then dry laminated with the protective film of Example 1-1a via an adhesive for dry lamination (Takelac A540; manufactured by Mitsui Chemicals, Inc.) (thickness 2 µm), and further coated with a surface protection layer in the form of a two-component curing polyurethane resin layer (layer thickness 8 µm) composed of an acrylic polyol (a copolymer of methyl methacrylate and 2-hydroxymethacrylate) and a curing agent (a nurate of hexamethylene diisocyanate). This produced the decorative sheet of Example 1-1b.

Example 1-1c

The protective film of Example 1-1c was obtained using the same method as in Example 1-1a, except for using a content of 1.5 parts by mass of the compound represented by formula (4) below (TINOSORB S; manufactured by BASF Japan Ltd.), which serves as the hydroxyphenyltriazine-based ultraviolet absorber in Example 1-1a.

Example 1-1d

A substrate was obtained by forming a pattern layer (thickness 3 µm) by gravure printing a wood grain pattern using a two-component urethane ink (V180; manufactured by Toyo Ink Co., Ltd.) on an opaque polyethylene primary film (thickness 70 µm), and the substrate was then dry laminated with the protective film of Example 1-1c via an adhesive for dry lamination (Takelac A540; manufactured by Mitsui Chemicals, Inc.) (thickness 2 µm), and further coated with a surface protection layer in the form of a two-component curing polyurethane resin layer (layer thickness 8 µm) composed of an acrylic polyol (a copolymer of methyl methacrylate and 2-hydroxymethacrylate) and a curing agent (a nurate of hexamethylene diisocyanate). This produced the decorative sheet of Example 1-1d.

Comparative Example 1-1a

The protective film of Comparative Example 1-1a was obtained using the same method as in Example 1-1a, except for adding 0.5 parts by mass of the compound represented by formula (9) below (ADK STAB LA-F70; manufactured by ADEKA Corp.) as the hydroxyphenyltriazine-based ultraviolet absorber of Example 1-1a.

Comparative Example 1-1b

The decorative sheet of Comparative Example 1-1b was obtained using the same method as in Example 1-1b, except for using the protective film of Comparative Example 1-1a as the protective film of Example 1-1b.

Comparative Example 1-2a

The protective film of Comparative Example 1-2a was obtained using the same method as in Example 1-1a, except for adding 0.5 parts by mass of the compound represented by formula (10) below (Tinuvin 1600; manufactured by BASF Japan Ltd.) as the hydroxyphenyltriazine-based ultraviolet absorber of Example 1-1a.

Comparative Example 1-2b

The decorative sheet of Comparative Example 1-2b was obtained using the same method as in Example 1-1b, except for using the protective film of Comparative Example 1-2a as the protective film of Example 1-1b.

Comparative Example 1-3a

The protective film of Comparative Example 1-3a was obtained using the same method as in Example 1-1a, except for adding 0.5 parts by mass of the compound represented by formula (11) below (CYASORB UV1164; manufactured by Sun Chemical Co., Ltd.) as the hydroxyphenyltriazine-based ultraviolet absorber of Example 1-1a.

Comparative Example 1-3b

The decorative sheet of Comparative Example 1-3b was obtained using the same method as in Example 1-1b, except for using the protective film of Comparative Example 1-3a as the protective film of Example 1-1b.

[Chemical Formula 16]

(4)

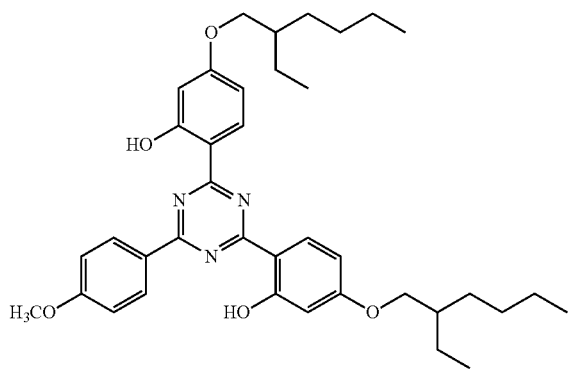

[Chemical Formula 17]

(9)

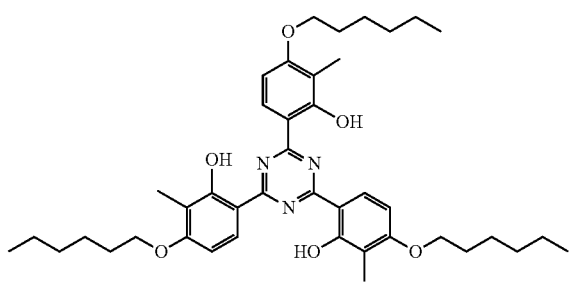

[Chemical Formula 18]

(10)

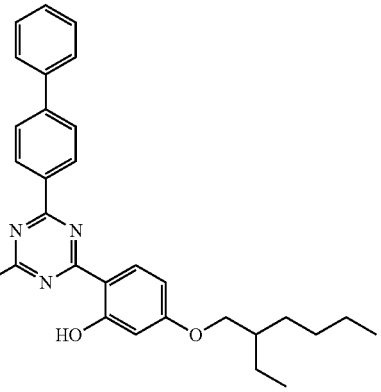

[Chemical Formula 19]

(11)

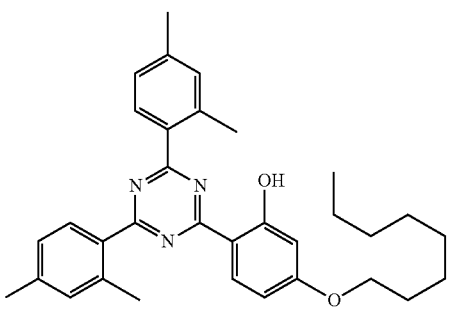

The hydroxyphenyltriazine-based ultraviolet absorbers used in the Examples and Comparative Examples have structures in which R1-R8 in general formula (12) below represent the substituents shown in Table 1 below, and of these, the compounds used in Example 1-1a and Example 1-1b correspond to hydroxyphenyltriazine-based ultraviolet absorbers as defined in the present embodiment, and are represented by general formula (1) above.

[Chemical Formula 20]

(12)

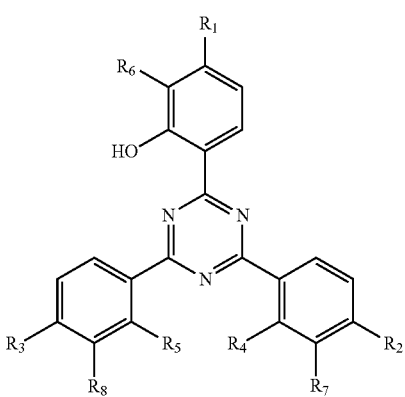

TABLE 1

| Substituent | Examples 1-1a, 1-1b, 1-1c, and 1-1d TINOSORB S | Comparative Examples 1-1a and 1-1b ADK STAB LA-F70 | Comparative Examples 1-2a and 1-2b Tinuvin 1600 | Comparative Examples 1-3a and 1-3b CYASORB 1164 |
|---|---|---|---|---|
| R1 | 2-Ethylhexyloxy group | n-Hexyloxy group | 2-Ethylhexyloxy group | n-Octyloxy group |
| R2 | 2-Ethylhexyloxy group | n-Hexyloxy group | Phenyl group | Methyl group |
| R3 | Methoxy group | n-Hexyloxy group | Phenyl group | Methyl group |
| R4 | Hydroxyl group | Hydroxyl group | Hydrogen atom | Methyl group |
| R5 | Hydrogen atom | Hydroxyl group | Hydrogen atom | Methyl group |
| R6 | Hydrogen atom | Methyl group | Hydrogen atom | Hydrogen atom |
| R7 | Hydrogen atom | Methyl group | Hydrogen atom | Hydrogen atom |
| R8 | Hydrogen atom | Methyl group | Hydrogen atom | Hydrogen atom |

<Evaluation>

The design properties and weather resistance of the protective films and decorative sheets obtained in the above Examples and Comparative Examples were evaluated according to the following method. The evaluation results for the protective films and the decorative sheets are respectively shown in Table 2 and Table 3 below.

1) Protective Film
a) Design Properties

ΔL: The L value was used as an index of the white turbidity of the protective film. The protective film was placed on black PET (Lumirror 188X30; manufactured by Toray Industries, Inc.), and the L value was measured using a spectrophotometer (X-Rite 500 series; X-Rite Inc.). A reference film was separately prepared which was the same protective film as that of Example 1-1a except for containing no ultraviolet absorbers, the L value of the reference film was similarly measured, and the value ΔL was obtained by subtracting the L value of the protective film from the L value of the reference film. A larger ΔL value indicates more significant white turbidity compared to the reference film.

Visual evaluation 1: the appearance of the protective film was visually evaluated according to the following criteria.
<Evaluation Criteria for Visual Evaluation 1>
Good: no difference in white turbidity observed compared to reference film
Poor: significant difference in white turbidity observed compared to reference film b) Weather Resistance Visual evaluation 2: the appearance of the protective film was visually evaluated after an accelerated weathering test according to the following criteria. The accelerated weathering test was performed using an EYE Super UV Tester (SUV-W161; Iwasaki Electric Co., Ltd.), and a total of 30 cycles carried out at a black panel temperature of 63° C. and an illuminance of 65 mW/cm$^2$, with a single cycle being 20 hours UV irradiation and 4 hours condensation.
<Evaluation Criteria for Visual Evaluation 2>
Good: no change in appearance of protective film
Poor: cracking observed in protective film 2) Decorative Sheet
a) Design Properties Visual evaluation 3: the appearance of the decorative sheet was visually evaluated according to the following criteria.
<Evaluation Criteria for Visual Evaluation 3>
Good: no difference in appearance observed compared to reference sheet
Poor: white turbidity is observed compared to reference sheet Note that the reference sheet was a separately prepared sheet which was the same decorative sheet as that of Example 1-1b except for containing no ultraviolet absorbers.

b) Weather Resistance

Visual evaluation 4: the appearance of the decorative sheet was visually evaluated after an accelerated weathering test according to the following criteria. The accelerated weathering test was carried out using the same conditions as in visual evaluation 2 above.
<Evaluation Criteria for Visual Evaluation 4>
Good: minor pattern discoloration in decorative sheet
Poor: significant pattern discoloration observed in decorative sheet

TABLE 2

| | Ultraviolet absorber | | Design properties | Weather resistance |
|---|---|---|---|---|
| | Product Name | Structure | Visual evaluation ΔL 1 | Visual evaluation 2 |
| Example 1-1a | TINOSORB S | Chemical Formula 4 | −0.1 Good | Good |
| Example 1-1c | TINOSORB S | Chemical Formula 4 | 0.5 Good | Good |
| Comparative Example 1-1a | ADK STAB LA-F70 | Chemical Formula 9 | 6.9 Poor | Poor |
| Comparative Example 1-2a | Tinuvin 1600 | Chemical Formula 10 | 3.6 Poor | Good |
| Comparative Example 1-3a | CYASORB UV-1164 | Chemical Formula 11 | −0.0 Good | Poor |

TABLE 3

| | Product Name | Structure | Design properties Visual evaluation 3 | Weather resistance Visual evaluation 4 |
|---|---|---|---|---|
| Example 1-1b | TINOSORB S | Chemical Formula 4 | Good | Good |
| Example 1-1d | TINOSORB S | Chemical Formula 4 | Good | Good |
| Comparative Example 1-1b | ADK STAB LA-F70 | Chemical Formula 9 | Poor | Poor |
| Comparative Example 1-2b | Tinuvin 1600 | Chemical Formula 10 | Poor | Good |
| Comparative Example 1-3b | CYASORB UV-1164 | Chemical Formula 11 | Good | Poor |

As shown in Table 2 and Table 3, in the protective film and decorative sheet according to the present embodiment exemplified in Examples 1-1a to 1-1d, the application of a hydroxyphenyltriazine-based ultraviolet absorber having a specific structure to the transparent polyolefin resin layer

Second Example

Example 2-1

A substrate was obtained by forming a pattern layer (thickness 3 μm) by gravure printing a wood grain pattern using a two-component urethane ink (V180; manufactured by Toyo Ink Co., Ltd.) on an opaque polyethylene primary film (thickness 70 μm), and a transparent resin layer, that is to say, a transparent polyolefin resin layer, was formed on the substrate by extrusion laminating the resin composition described below with a thickness of 80 μm via an adhesive for dry lamination (Takelac A540; manufactured by Mitsui Chemicals, Inc.) (thickness 2 μm). This was further coated with a surface protection layer in the form of a two-component curing polyurethane resin layer (layer thickness 8 μm) composed of an acrylic polyol (a copolymer of methyl methacrylate and 2-hydroxymethacrylate) and a curing agent (a nurate of hexamethylene diisocyanate), thereby producing the decorative sheet of Example 2-1.

(Resin Composition)

Transparent homopolypropylene resin (Prime Polypro; manufactured by Prime Polymer Co., Ltd.)
  99 parts by mass
Light stabilizer (Tinuvin XT55; manufactured by BASF Japan Ltd.)
  0.5 parts by mass
UVA-A (TINOSORB S (see formula (4) below), BASF Japan Ltd.)
  0.075 parts by mass
UVA-B (CYASORB 1164; (see formula (6) below), Sun Chemical Co., Ltd.)
  0.175 parts by mass
Mass ratio (UVA-A/UVA-B)=30/70

Note that the content of UVA-A, UVA-B were each calculated as parts by mass with respect to 99 parts by mass of the transparent homopolypropylene resin and 0.5 parts by mass of the light stabilizer.

Example 2-2

The decorative sheet of Example 2-2 was obtained using the same method as in Example 2-1, except for using a UVA-A content of 0.125 parts by mass and a UVA-B content of 0.125 parts by mass (UVA-A/UVA-B=50/50) in the resin composition of Example 2-1.

Example 2-3

The decorative sheet of Example 2-3 was obtained using the same method as in Example 2-1, except for using a UVA-A content of 0.175 parts by mass and a UVA-B content of 0.075 parts by mass (UVA-A/UVA-B=70/30) in the resin composition of Example 2-1.

Example 2-4

The decorative sheet of Example 2-4 was obtained using the same method as in Example 2-1, except for using a UVA-A content of 0.085 parts by mass and a UVA-B content of 0.085 parts by mass (UVA-A/UVA-B=50/50) in the resin composition of Example 2-1.

Comparative Example 2-1

The decorative sheet of Comparative Example 2-1 was obtained using the same method as in Example 2-1, except for using a UVA-A content of 0.025 parts by mass and a UVA-B content of 0.225 parts by mass (UVA-A/UVA-B=10/90) in the resin composition of Example 2-1.

Comparative Example 2-2

The decorative sheet of Comparative Example 2-2 was obtained using the same method as in Example 2-1, except for using a UVA-A content of 0.225 parts by mass and a UVA-B content of 0.025 parts by mass (UVA-A/UVA-B=90/10) in the resin composition of Example 2-1.

Comparative Example 2-3

The decorative sheet of Comparative Example 2-3 was obtained using the same method as in Example 2-1, except for substituting UVA-A with ADK STAB LA-F70 (see formula (9) below, ADEKA Corp.), using a content of 0.085 parts by mass of the substituted resin, and a UVA-B content of 0.195 parts by mass in the resin composition of Example 2-1. Note that neither UVA-A nor UVA-B correspond to formula (9) below.

The content of ADK STAB LA-F70 was calculated as parts by mass with respect to 99 parts by mass of the transparent homopolypropylene resin and 0.5 parts by mass of the light stabilizer.

Comparative Example 2-4

In Example 2-1 the content of UVA-A in the resin composition was 0.140 parts by mass, and UVA-B was substituted with (Tinuvin 1600; see formula (10) below, BASF Japan Ltd.), and the replacement thereof. The decorative sheet of Comparative Example 2-4 was obtained in the same manner as in Example 2-1 except that the content of the ultraviolet absorber was 0.100 parts by mass. In addition, neither UVA-A nor UVA-B corresponds to the following formula (10).

Note that the content of Tinuvin 1600 was calculated as parts by mass with respect to 99 parts by mass of the transparent homopolypropylene resin and 0.5 parts by mass of the light stabilizer.

[Chemical Formula 21]

(4)

-continued

[Chemical Formula 22]

(6)

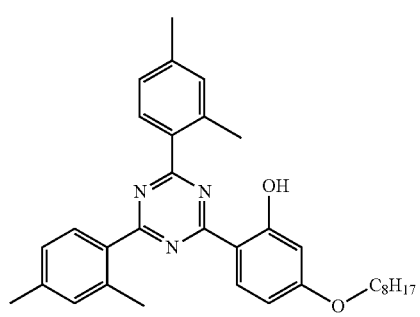

[Chemical Formula 23]

(9)

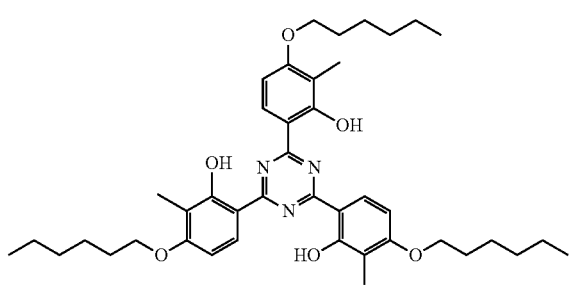

[Chemical Formula 24]

(10)

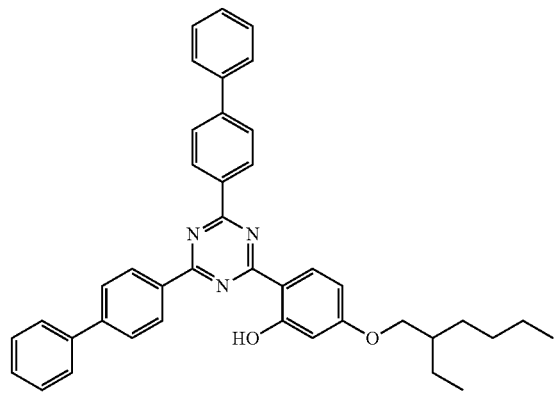

The ultraviolet absorbers included in the transparent resin layers of the above Examples and Comparative Examples are shown in Table 4 below. The "average absorbance" shown in Table 4 indicates the average absorbance in a wavelength region of 250 nm to 400 nm. Further, the value "$A_{370}/A_{280}$" shown in Table 4 indicates the value obtained by dividing the absorbance of the transparent resin layer at 370 nm by the absorbance at 280 nm.

<Evaluation>

The design properties and weather resistance of the decorative sheets obtained in the above Examples and Comparative Examples were evaluated according to the following method. The evaluation results are shown in Table 4.

a) Design Properties

The appearance of the decorative sheet was visually evaluated according to the following criteria. Note that the reference sheet was a separately prepared sheet which was the same decorative sheet as that of Example 2-1 except for containing no ultraviolet absorbers.

Good: no difference in appearance observed compared to the reference sheet

Poor: white turbidity is observed compared to the reference sheet b) Weather Resistance The appearance of the decorative sheet after the accelerated weathering test was visually observed, and discoloration of the pattern and the change in appearance of the protective film were evaluated according to the following criteria. Note that the accelerated weathering test was performed using an EYE Super UV Tester (SUV-W161; Iwasaki Electric Co., Ltd.), and a total of 30 cycles carried out at a black panel temperature of 63° C. and an illuminance of 65 mW/cm², with a single cycle being 20 hours UV irradiation and 4 hours condensation.

(Pattern Discoloration)

The evaluation was made according to three levels 3, 2, and 1, with 3 being the largest level of discoloration.

(Change in Appearance of Protective Film)

Good: no difference in appearance observed

Fair: cracking of transparent resin layer observed (minor)

Poor: cracking of transparent resin layer observed (major)

TABLE 4

| | UVA-A | | UVA-B | | Other ultraviolet absorber | | UVA-A/B | Average absorbance ※2 | $A_{370}/A_{280}$ ※3 | Design properties | Weather resistance | |
|---|---|---|---|---|---|---|---|---|---|---|---|---|
| | | | | | | | | | | | Pattern discoloration | Change in appearance of protective film |
| | Type | Content ※1 | Type | Content ※1 | Type | Content ※1 | | | | | | |
| Example 2-1 | TINOSORB S | 0.075 | CYASORB 1164 | 0.175 | None | | 30/70 | 0.58 | 0.26 | Good | 2 | Good |
| Example 2-2 | TINOSORB S | 0.125 | CYASORB 1164 | 0.125 | None | | 50/50 | 0.58 | 0.43 | Good | 1 | Good |
| Example 2-3 | TINOSORB S | 0.175 | CYASORB 1164 | 0.075 | None | | 70/30 | 0.59 | 0.66 | Good | 1 | Good |
| Example 2-4 | TINOSORB S | 0.085 | CYASORB 1164 | 0.085 | None | | 50/50 | 0.40 | 0.43 | Good | 2 | Fair |
| Comparative Example 2-1 | TINOSORB S | 0.025 | CYASORB 1164 | 0.225 | None | | 10/90 | 0.58 | 0.15 | Good | 3 | Good |

TABLE 4-continued

| | UVA-A | | UVA-B | | Other ultraviolet absorber | | UVA-A/B | Average absorbance ※2 | $A_{370}/A_{280}$ ※3 | Design properties | Pattern discoloration | Change in appearance of protective film |
|---|---|---|---|---|---|---|---|---|---|---|---|---|
| | Type | Content ※1 | Type | Content ※1 | Type | Content ※1 | | | | | | |
| Comparative Example 2-2 | TINOSORB S | 0.225 | CYASORB 1164 | 0.025 | None | | 90/10 | 0.59 | 1.04 | Good | 1 | Poor |
| Comparative Example 2-3 | None | | CYASORB 1164 | 0.195 | ADK STAB LA-F70 | 0.085 | — | 0.59 | 0.27 | Poor | 2 | Good |
| Comparative Example 2-4 | TINOSORB S | 0.140 | None | | Tinuvin 1600 | 0.100 | — | 0.60 | 0.99 | Poor | 1 | Fair |

※1 Parts by mass with respect to 99 parts by mass of the transparent homopolypropylene resin and 0.5 parts by mass of the light stabilizer
※2 250-400 nm
※3 A value obtained by dividing the absorbance of the transparent resin layer at 370 nm by the absorbance at 280 nm As shown in Table 4, the decorative sheet according to the present embodiment exemplified in the Examples had excellent design properties due to the low level of white turbidity, and excellent weather resistance.

Third Example

Example 3-1

A substrate was obtained by forming a pattern layer (thickness 3μm) by gravure printing a wood grain pattern using a two-component urethane ink (V180; manufactured by Toyo Ink Co., Ltd.) on an opaque polyethylene primary film (thickness 70 μm), and the transparent resin layer composition described below was extrusion laminated with a thickness of 80 μm via an adhesive for dry lamination (Takelac A540; manufactured by Mitsui Chemicals, Inc.) (thickness 2 μm). Further, the surface protection layer composition below was coated and dried on the transparent resin layer by gravure coating, and cured at 25° C. for 3 days, thereby producing the decorative sheet of Example 3-1.

(Transparent Resin Layer Composition)

Transparent homopolypropylene resin (Prime Polypro; manufactured by Prime Polymer Co., Ltd.)
99 parts by mass Ultraviolet absorber (Tinuvin 326; manufactured by BASF Japan Ltd.)
0.5 parts by mass Light stabilizer (Tinuvin XT55; manufactured by BASF Japan Ltd.)
0.5 parts by mass (Surface Protection Layer Composition)

Base resin (methyl methacrylate/2-hydroxyethyl methacrylate=95/5 copolymer)
90 parts by mass Ultraviolet absorber (TINOSORB S (formula (4) below); manufactured by BASF Japan Ltd.)
9 parts by mass Light stabilizer (Tinuvin 123; manufactured by BASF Japan Ltd.)
1 part by mass Curing agent (Takenate D-170; Mitsui Chemicals, Inc.)
10 parts by mass Solvent (ethyl acetate) 240 parts by mass Comparative Example 3-1

The decorative sheet of Comparative Example 3-1 was obtained using the same method as in Example 3-1, except for using the compound shown in formula (9) below (ADK STAB LA-F70; manufactured by ADEKA Corp.) as the ultraviolet absorber in the surface protection layer composition of Example 3-1.

Comparative Example 3-2

The decorative sheet of Comparative Example 3-2 was obtained using the same method as in Example 3-1, except for using the compound shown in formula (8) below (Tinuvin 400; manufactured by BASF Japan Ltd.) as the ultraviolet absorber in the surface protection layer composition of Example 3-1.

Comparative Example 3-3

The decorative sheet of Comparative Example 3-3 was obtained using the same method as in Example 3-1, except for using the compound shown in formula (13) below (Tinuvin 477; manufactured by BASF Japan Ltd.) as the ultraviolet absorber in the surface protection layer composition of Example 3-1.

Comparative Example 3-4

The decorative sheet of Comparative Example 3-4 was obtained using the same method as in Example 3-1, except for using the compound shown in formula (14) below (Tinuvin 479; manufactured by BASF Japan Ltd.) as the ultraviolet absorber in the surface protection layer composition of Example 3-1.

[Chemical Formula 25]
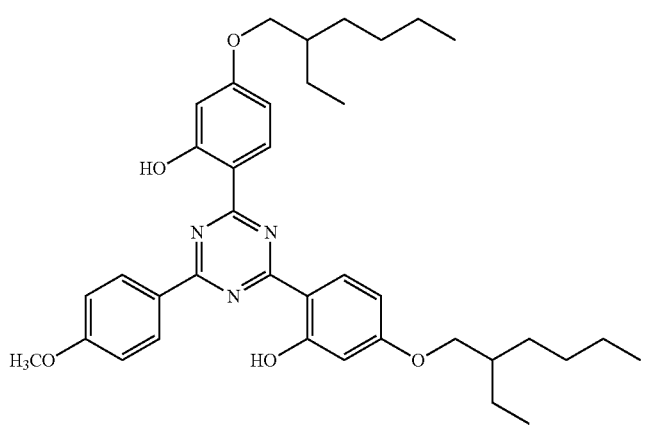
(4)
[Chemical Formula 26]
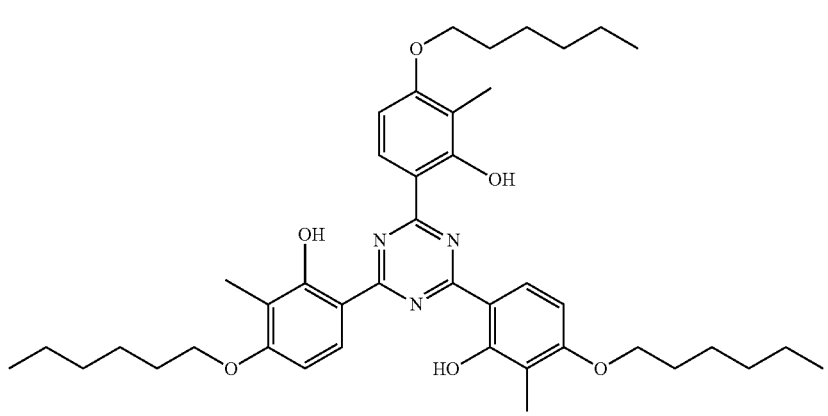
(9)
[Chemical Formula 27]
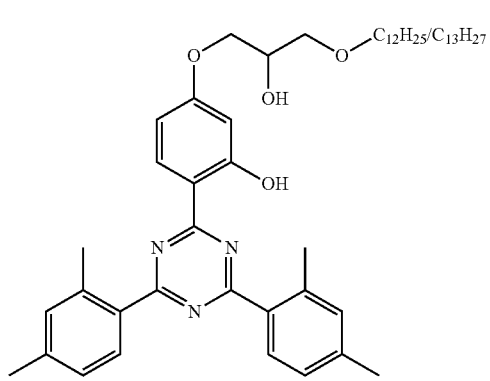
(8)

[Chemical Formula 28]
(13)
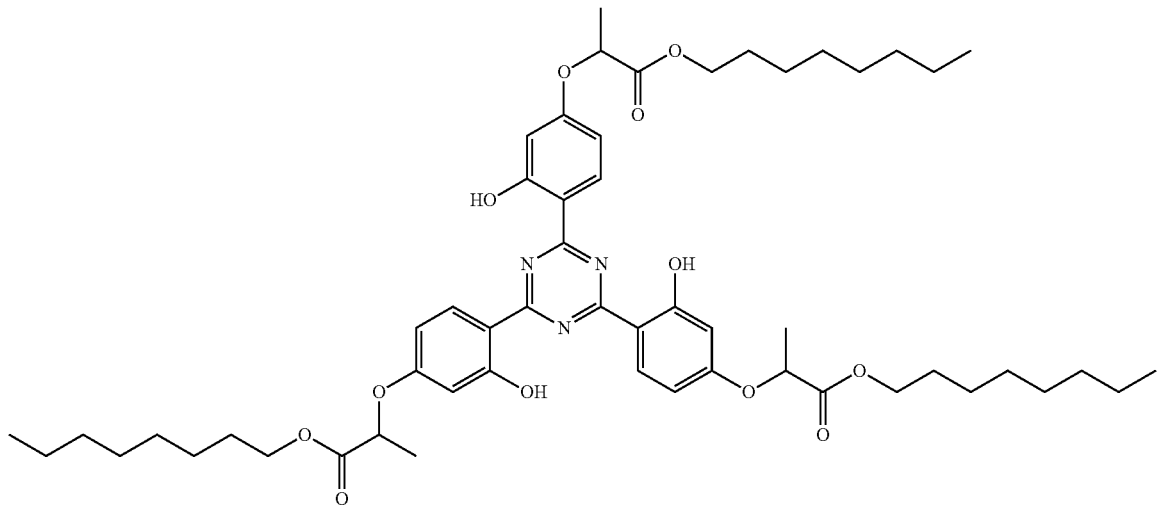
[Chemical Formula 29]
(14)
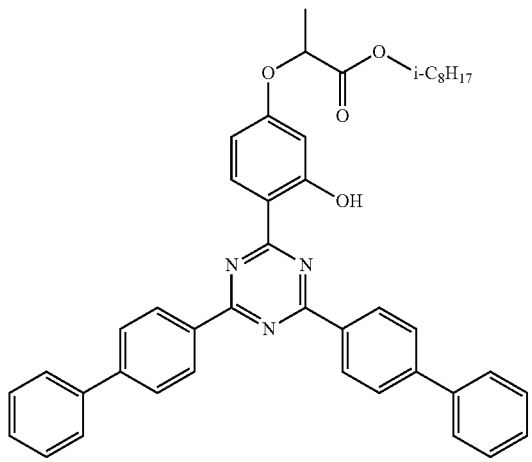

The hydroxyphenyltriazine-based ultraviolet absorbers used in the Examples and Comparative Examples have structures in which R1-R8 in general formula (12) below represent the substituents shown in Table 5 below, and of these, the compound used in Example 3-1 corresponds to a hydroxyphenyltriazine-based ultraviolet absorber as defined in the present embodiment, and is represented by general formula (1) above.

[Chemical Formula 30]

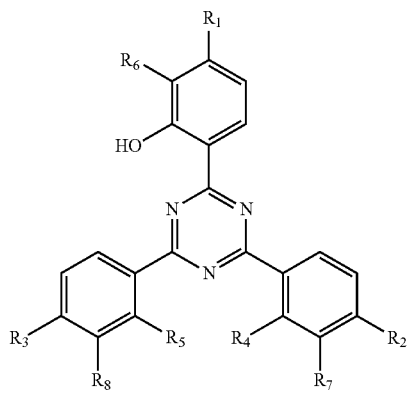

(12)

were ranked 4, 3, 2, or 1 in order of the largest pattern discoloration. The accelerated weathering test was performed using an EYE Super UV Tester (SUV-W161; Iwasaki Electric Co., Ltd.), and a total of 30 cycles carried out at a black panel temperature of 63° C. and an illuminance of 65 mW/cm², with a single cycle being 20 hours UV irradiation and 4 hours condensation. If the evaluation of the weather resistance was "1" or "2", the specimen was taken as acceptable because there was no problem associated with its use.

TABLE 6

|  | Ultraviolet absorber | Design properties | Weather resistance |
| --- | --- | --- | --- |
| Example 3-1 | TINOSORB S | Good | 1 |
| Comparative Example 3-1 | ADK STAB LA-F70 | Poor | 2 |
| Comparative Example 3-2 | Tinuvin 400 | Good | 4 |
| Comparative Example 3-3 | Tinuvin 477 | Good | 3 |
| Comparative Example 3-4 | Tinuvin 479 | Good | 3 |

As shown in Table 6, in the decorative sheet according to the present embodiment exemplified in Example 3-1, the application of a hydroxyphenyltriazine-based ultraviolet absorber having a specific structure to the surface protection

TABLE 5

| Substituent | Example 3-1 | Comparative Example 3-1 | Comparative Example 3-2 | Comparative Example 3-3 | Comparative Example 3-4 |
| --- | --- | --- | --- | --- | --- |
|  | TINOSORB S | ADK STAB LA-F70 | Tinuvin 400 | Tinuvin 477 | Tinuvin 479 |
| R1 | 2-Ethylhexyloxy group | n-Hexyloxy group | 2-Hydroxy-3-tridecyloxypropyloxy group or 2-hydroxy-3-dodecyloxypropyloxy group | 1-Octyloxycarbonylethoxy group | 1-Isooctyloxycarbonylethoxy group |
| R2 | 2-Ethylhexyloxy group | n-Hexyloxy group | Methyl group | 1-Octyloxycarbonylethoxy group | Phenyl group |
| R3 | Methoxy group | n-Hexyloxy group | Methyl group | 1-Octyloxycarbonylethoxy group | Phenyl group |
| R4 | Hydroxyl group | Hydroxyl group | Methyl group | Hydroxy group | Hydrogen atom |
| R5 | Hydrogen atom | Hydroxyl group | Methyl group | Hydroxy group | Hydrogen atom |
| R6 | Hydrogen atom | Methyl group | Hydrogen atom | Hydrogen atom | Hydrogen atom |
| R7 | Hydrogen atom | Methyl group | Hydrogen atom | Hydrogen atom | Hydrogen atom |
| R8 | Hydrogen atom | Methyl group | Hydrogen atom | Hydrogen atom | Hydrogen atom |

<Evaluation>

The design properties and weather resistance of the decorative sheets obtained in the above Examples and Comparative Examples were evaluated according to the following method. The evaluation results are shown in Table 6.

a) Design Properties

The appearance of the decorative sheet was visually evaluated according to the following criteria. Note that the reference sheet was a separately prepared sheet which was the same decorative sheet as that of Example 3-1 except for containing no ultraviolet absorbers.

Good: no difference in appearance observed compared to the reference sheet

Poor: white turbidity is observed compared to the reference sheet b) Weather Resistance The appearance of the decorative sheets was visually observed after an accelerated weathering test, and the sheets layer resulted in excellent design properties due to the low level of white turbidity, and excellent weather resistance.

INDUSTRIAL APPLICABILITY

In addition to decorative sheets and sheets used outdoors such as posters and signs, the present invention can be used as sheets used indoors, such as surface materials for joinery and floor materials.

REFERENCE SIGNS LIST

10 Protective film; 11 Transparent polyolefin resin layer (transparent resin layer); 12 Surface protection layer; 20 Adhesive layer; 30 Substrate; 31 Primary film; 32 Pattern layer; 40 Decorative sheet.

What is claimed is:

1. A protective film comprising a transparent polyolefin resin layer and a surface protection layer on the transparent polyolefin resin layer, wherein the transparent polyolefin resin layer contains a transparent polyolefin resin and a hydroxyphenyltriazine-based ultraviolet absorber (UVA-A) having a structure represented by general formula 2 below:

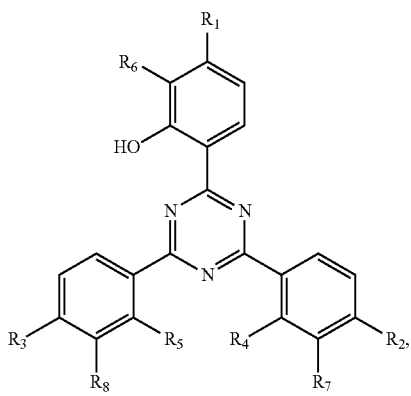

(2)

wherein in general formula (2), $R_1$ and $R_2$ represent an alkoxy group having 8-18 carbon atoms, $R_3$ represents an alkoxy group having 1-4 carbon atoms, $R_4$ represents a hydroxyl group, and $R_5$-$R_8$ represent a hydrogen atom, wherein the ultraviolet absorber (UVA-A) is the only hydroxyphenyltriazine-based ultraviolet absorber in the transparent polyolefin resin layer, the transparent polyolefin resin layer does not contain a benzotriazole-based ultraviolet absorber, the surface protection layer has a thickness of 3 μm to 20 μm, and the transparent polyolefin resin layer has a thickness of 20 μm to 200 μm.

2. The protective film of claim 1, wherein the ultraviolet absorber (UVA-A) has a structure represented by formula (3) below.

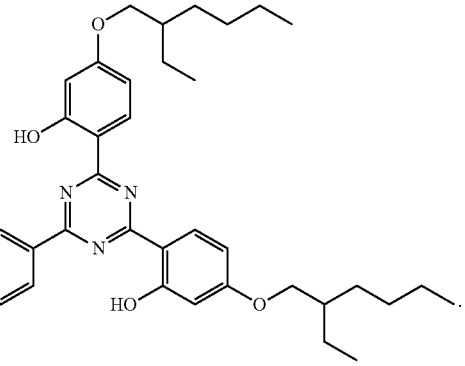

(3)

3. The protective film of claim 1, wherein the transparent polyolefin resin layer further includes a hindered amine light stabilizer.

4. A sheet having a configuration in which a protective film of claim 1 and a substrate are bonded together.

5. The protective film of claim 1, wherein the surface protection layer consists of a resin selected from the grop consisting of urethane-based resins, acrylic-based resins, acrylic silicone-based resins, fluorine-based resins, and epoxy-based resins.

6. The protective film of claim 1, wherein a content of the hydroxyphenyltriazine-based ultraviolet absorber (UVA-A) in the transparent polyolefin resin layer is within a range of 0.1 parts by mass or more and 2 parts by mass or less with respect to 100 parts by mass of the polyolefin resin.

7. The protective film of claim 2, wherein a content of the hydroxyphenyltriazine-based ultraviolet absorber (UVA-A) in the transparent polyolefin resin layer is within a range of 0.1 parts by mass or more and 2 parts by mass or less with respect to 100 parts by mass of the polyolefin resin.

8. The protective film of claim 3, wherein a content of the hydroxyphenyltriazine-based ultraviolet absorber (UVA-A) in the transparent polyolefin resin layer is within a range of 0.1 parts by mass or more and 2 parts by mass or less with respect to 100 parts by mass of the polyolefin resin.

9. The protective film of claim 5, wherein a content of the hydroxyphenyltriazine-based ultraviolet absorber (UVA-A) in the transparent polyolefin resin layer is within a range of 0.1 parts by mass or more and 2 parts by mass or less with respect to 100 parts by mass of the polyolefin resin.

10. The protective film of claim 1, wherein the transparent polyolefin resin layer has an average absorbance of 0.5 or more in a wavelength range of 250 nm or more and 400 nm or less.

* * * * *